Aug. 5, 1941.    G. S. AVERY, JR    2,251,263
GRAFTING SUBSTANCE
Filed Sept. 28, 1937

Inventor
GEORGE S. AVERY, Jr.

Patented Aug. 5, 1941

2,251,263

UNITED STATES PATENT OFFICE 2,251,263

GRAFTING SUBSTANCE

George S. Avery, Jr., New London, Conn., assignor to The Dow Chemical Company, Midland, Mich., a corporation of Michigan Application September 28, 1937, Serial No. 166,234

3 Claims. (Cl. 47—6)

This invention relates to material for assisting grafting plants.

Heretofore, in graft, the union of stock and cion has been too slow between certain varieties of trees and shrubs and the rate of growth during the first year of the graft has therefore been undesirably retarded. Moreover, it has been found that the union between the stock and cion has in many instances been weak, which permits storm injury to occur to the grafted trees.

It is an object of the present invention to increase the speed of union between stock and cion and to increase the mechanical strength of such union.

Further objects of the invention are to provide materials and processes which are, respectively, cheap to manufacture, and which are readily carried out with relatively small outlay for labor.

These and other objects in view which will be readily apparent from the ensuing specification, I herewith show means for carrying the same into practical effect, with the understanding that steps and materials may be varied within the scope of the invention.

Figure 1:
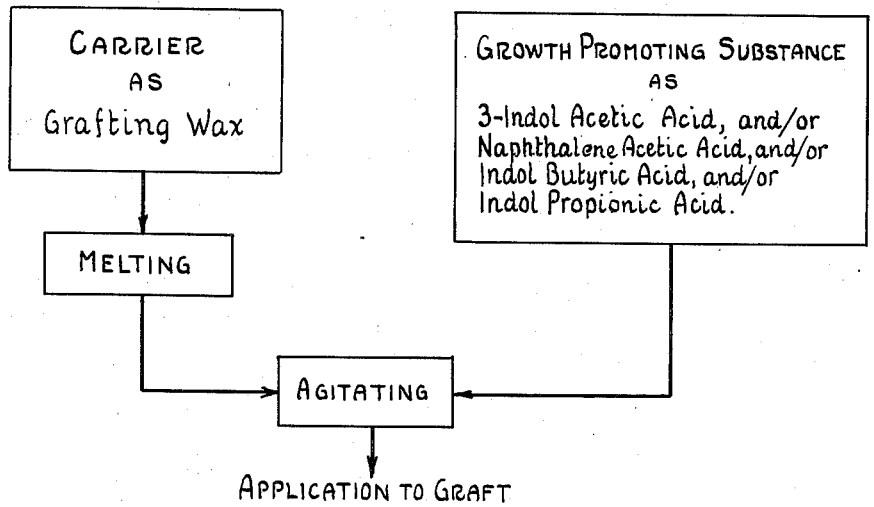
Figure 1 represents a flow diagram representing how the materials for effecting the graftings may be compounded.

My invention comprises new compositions of matter and new methods of applying such compositions of matter. The compositions of matter employed are (1), a carrier; and (2), a growth promoting substance. In general, it is preferable to use as a carrier, materials such as the present grafting waxes. These carriers are easy to mold in place around stock and cion; they harden and hold the stock and cion in fixed position during the time it takes for the graft union to form. The growth promoters used are substances which promote cell proliferation at certain concentrations, thus speeding the formation of a callus tissue, which unites stock and cion satisfactorily. The care necessary to perform the proper graft is not so great where a mixture of growth promoting substance and carrier is used.

It is understood that any of the usual grafting waxes may be employed. Grafting wax is sometimes made to apply warm and sometimes made to apply cold. Pitch makes it thick, suet makes it lighter, rosin makes it dry, and beeswax makes it oily. To these ingredients are sometimes added ochre, lard, sulphur, turpentine, and sifted cinders. The growth promoting substances disclosed herein, are added to the grafting wax.

Not only is the union between stock and cion made more speedily, but the union is stronger. The increased strength of the union aids in preventing breakage during windstorms, etc., of certain variety grafts, and the increased speed of the union produces a better, or more satisfactory, growth during the first year of the graft. The growth promoting substances used with the grafting wax are substances such as 3-indole acetic acid, naphthalene acetic acid, indole butyric acid, and indole propionic acid, all well known substances as regards their growth promoting properties. The concentration of the growth-promoting substance must not be so great as to kill the tissues. In strengths slightly lower than those which will produce killing of plant tissues, there is a tendency for the growth-promoting substance to produce roots. This occurrence, however, is not of such a serious nature as the destruction of the tissues because the roots eventually will shrivel and die soon after emergence. However, it is best to keep the concentration of the growth-promoting substance (as applied in grafting wax) slightly under that which will produce roots yet great enough to produce the desired stimulation.

The concentrations of the growth-promoting substance which may be employed vary with the substances and with the varieties of plants which are being grafted; also other factors, such as the condition of the stock and cion, whether exposed to intense or dull light, relative acidity or alkalinity of the grafting wax, etc.

In general, the concentration of the 3-indole acetic acid should be maintained between $1/100$th of one per cent and $3/100$ths of one per cent, by weight, of the total mixture of wax and growth-promoting substance. Good results are obtained by maintaining the concentration of the naphthalene acetic acid from approximately $5/1000$ths of one per cent to $1/100$th of one per cent, by weight, of the total mixture of wax and growth-promoting material. Similarly, other growth-promoting substances should be used in varying proportions, depending on their toxicity and the varieties of plants being grafted.

It has been found that the mixture of the grafting wax and the growth-promoting material should be accomplished without employing such high temperatures of the grafting wax as to inactivate the growth-promoting substance. However, the melting temperature of most of the grafting waxes is not sufficiently high to cause any injury to the growth-promoting substances which are covered by this invention; to obtain a thorough homogeneous mixture substances are generally mixed with the grafting wax while the grafting wax is in the melted condition, and the mass agitated to thoroughly distribute the materials throughout the wax. It is to be understood that a combination of two or more growth-promoting substances may be used at one time with the same carrier; for instance, 3-indole acetic acid and indole butyric or indole propionic acid or, under certain circumstances, naphthalene acetic acid, 3-indole acetic acid, indole butyric acid and indole propionic acid all mixed together with the same batch of grafting wax.

Figure 2:
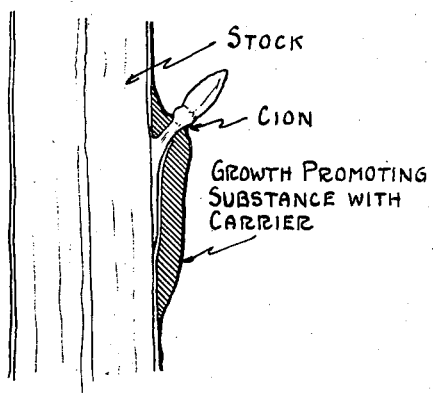
Fig. 2 is a diagrammatic illustration of one method of application, the "cion" in this instance being little more than a bud—the common practice of "budding."
Figure 3:
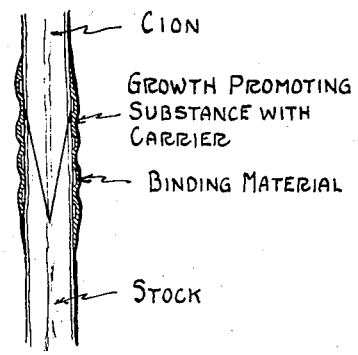
Fig. 3 is a diagrammatic illustration of another method of application, the usual grafting technique.

The grafting wax with the growth-promoting substance may be applied to the stock and cion by the usual means, i. e., as shown in Figure 2, by molding tightly with the hands about the union, after first tying-in the bud in the usual manner. Another method of application is to heat the mixture until the wax melts, then give the stock and cion a thin coating (with a brush), as shown in Figure 3. This may be done after the union has been tied with rubber strips or other known types of tying materials.

In order to insure speedy and strong union of stock and cion, it is necessary that the growth-promoting substances be freshly mixed with the wax, because the growth-promoting substances often deteriorate on standing. This is particularly true of 3-indole acetic acid. After the mixing of the wax and the growth-promoting substance, it is in general desirable to keep the containers in the dark to prevent inactivation by light.

It is desirable that this patent be limited only by the scope of the appended claims and the showing of the prior art.

I claim:

1. A graft-union promoting material comprising a mixture of grafting wax and isolated 3-indole acetic acid, said 3-indole acetic acid forming between $\frac{1}{100}$th and $\frac{3}{100}$ths per cent of the total weight of said mixture.

2. A graft-union promoting material comprising a mixture of a grafting wax and naphthalene acetic acid, said naphthalene acetic acid forming less than one one-hundredth and at least five one-thousandths percent of the total weight of the said mixture.

3. A graft-union promoting material comprising a mixture of a grafting wax and an isolated chemical compound selected from the group consisting of 3-indole acetic acid, indole propionic acid, indole butyric acid, and naphthalene acetic acid, said isolated chemical compound forming between $\frac{5}{1000}$ths and $\frac{3}{100}$ths per cent of the total weight of the said mixture.

GEORGE S. AVERY, Jr.